United States Patent [19]

Hirasawa

[11] Patent Number: 5,564,084
[45] Date of Patent: Oct. 8, 1996

[54] TRANSMISSION POWER LEVEL MONITORING APPARATUS EMPLOYED IN TDMA COMMUNICATION SYSTEM

[75] Inventor: Kazuhiro Hirasawa, Hyogo, Japan

[73] Assignee: Mitsubishi Denki Kabushiki Kaisha, Tokyo, Japan

[21] Appl. No.: 434,118

[22] Filed: May 2, 1995

Related U.S. Application Data

[63] Continuation of Ser. No. 135,527, Oct. 13, 1993, abandoned.

[30] Foreign Application Priority Data

Feb. 15, 1993 [JP] Japan .................................. 5-047159

[51] Int. Cl.⁶ .................................................. H04B 17/00
[52] U.S. Cl. .................................... 455/115; 455/126
[58] Field of Search ..................... 455/115, 126, 455/127, 67.1, 70, 343, 91; 370/95.3; 375/295, 297

[56] References Cited

U.S. PATENT DOCUMENTS 5,101,176  3/1992  Norimatsu ................. 455/126
5,193,223  3/1993  Walczak et al. ........... 455/127
5,196,806  3/1993  Ichikara .................... 455/127
5,309,115  5/1994  Hashimoto et al. ....... 455/127

FOREIGN PATENT DOCUMENTS 0065415  3/1990  Japan ...................... 455/343

Primary Examiner—Reinhard J. Eisenzopf
Assistant Examiner—Nguyen Vo
Attorney, Agent, or Firm—Rothwell, Figg, Ernst & Kurz

[57] ABSTRACT

A transmission power level monitoring apparatus suitable for use in a digital communication system using a TDMA method. The transmission power level monitoring apparatus detects start and end times of a transmission slot in each TDMA frame. An A/D converter is triggered in the start and end times so as to convert transmission power into a digital signal. It is then decided whether or not the transmission power is in an improper state during the transmission slot and a nontransmission slot in each TDMA frame. If the answer is yes, then measures such as a display of a message indicative of its improper state on a display device, the transmission of data indicative of its improper state to other system and turning off a power source for a power amplifier of a transmitter are taken.

7 Claims, 4 Drawing Sheets

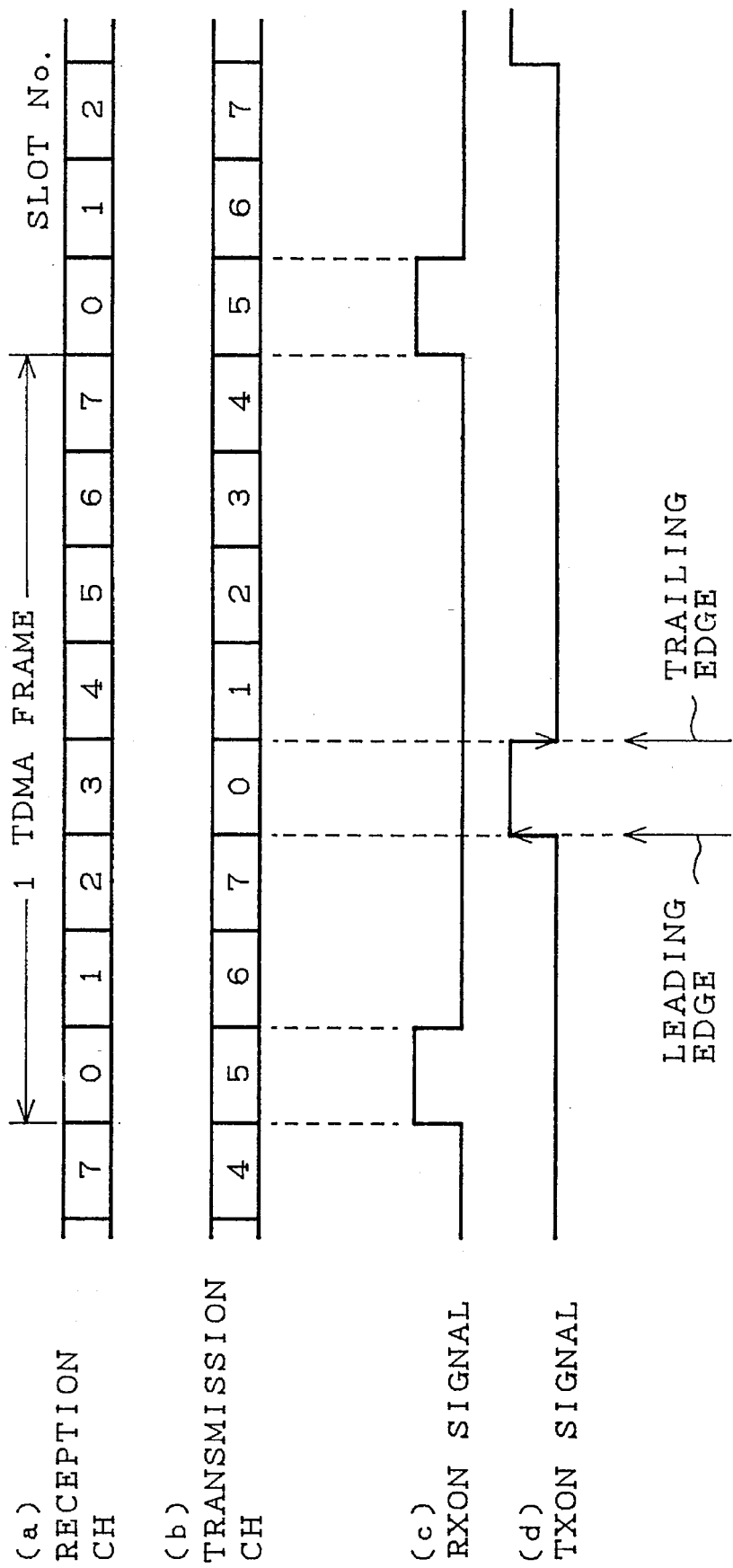

5,564,084

TRANSMISSION POWER LEVEL MONITORING APPARATUS EMPLOYED IN TDMA COMMUNICATION SYSTEM

This is a continuation of application Ser. No. 08/135,527, filed Oct. 13, 1993, now abandoned.

BACKGROUND OF THE INVENTION

1. Field of the Invention

The present invention relates to a TDMA mobile communication system for transmitting data therefrom and receiving the same therein in accordance with a TDMA method, and particularly to an RF power level monitoring apparatus suitable for use in a TDMA mobile communication system.

2. Description of the Prior Art

FIG. 6 is a view showing the structure of an RF power level monitoring apparatus which has conventionally been employed in an analog mobile communication system. In FIG. 6, reference numeral 121 indicates a CPU of the analog mobile communication system and reference numeral 123 indicates a transmitter including an unillustrated transmission and reception antenna. Further, reference numeral 124 indicates an A/D converter for converting an RF power level of a transmission signal frequency-converted into an RF band and whose power has been amplified, into a digital value.

In order to measure an analog level of a signal sent from the transmitter 123, the CPU 121 outputs a triggering signal to the A/D converter 124. The A/D converter 124 converts the analog level of the signal sent from the transmitter 123 into digital data in response to the triggering signal supplied from the CPU 121. After the conversion of the analog level into the digital data has been completed, the A/D converter 124 delivers a conversion end signal indicative of its completion to the CPU 121. When the CPU 121 recognizes the delivery of the conversion end signal from the A/D converter 124, the CPU 121 reads the digital data converted by the A/D converter 24 and makes a decision as to whether or not the analog level of the signal transmitted from the transmitter 123 is normal.

If it is decided that the analog level of the signal is in an improper state, then the CPU 121 displays the contents of its improper state on a display device of the analog mobile communication system. Sequentially the CPU 121 turns off an RF power amplifier or sends a signal indicative of its improper state to a system connected to the analog mobile communication system.

When the conventional power level monitoring apparatus having the above-described construction is applied to the analog communication system whose output to be transmitted is constant, the transmission power can be monitored accurately. However, a transmission signal is burst-transmitted during a few msec in a TDMA (Time Division Multiple Access) system. Therefore, the power to be transmitted cannot be measured with accuracy when the aforementioned power monitoring apparatus is used.

SUMMARY OF THE INVENTION

The present invention has been made to solve the aforementioned problem. It is therefore an object of the present invention to provide a transmission power level monitoring apparatus capable of accurately measuring power to be transmitted from a digital communication system using a TDMA system and recognizing an improper state of the power.

In order to achieve the above object, the transmission power level monitoring apparatus of the present invention detects start and end times of a transmission slot in each TDMA frame. An A/D converter is triggered in the start and end times so as to convert transmission power into a digital signal. It is then decided whether or not the transmission power is in an improper state during the transmission slot and a nontransmission slot in each TDMA frame. If the transmission power is in an improper state, then measures such as a display of a message indicative of its improper state on a display device, transmission of data indicative of its improper state to other system and turning off a power source for a power amplifier of a transmitter are taken.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 2 is a view for describing the timing of each of slots assigned to TDMA reception and transmission channels and the timing of each of RXON and TXON signals;

DETAILED DESCRIPTION OF THE PREFERRED EMBODIMENTS

[First embodiment]

Figure 1:
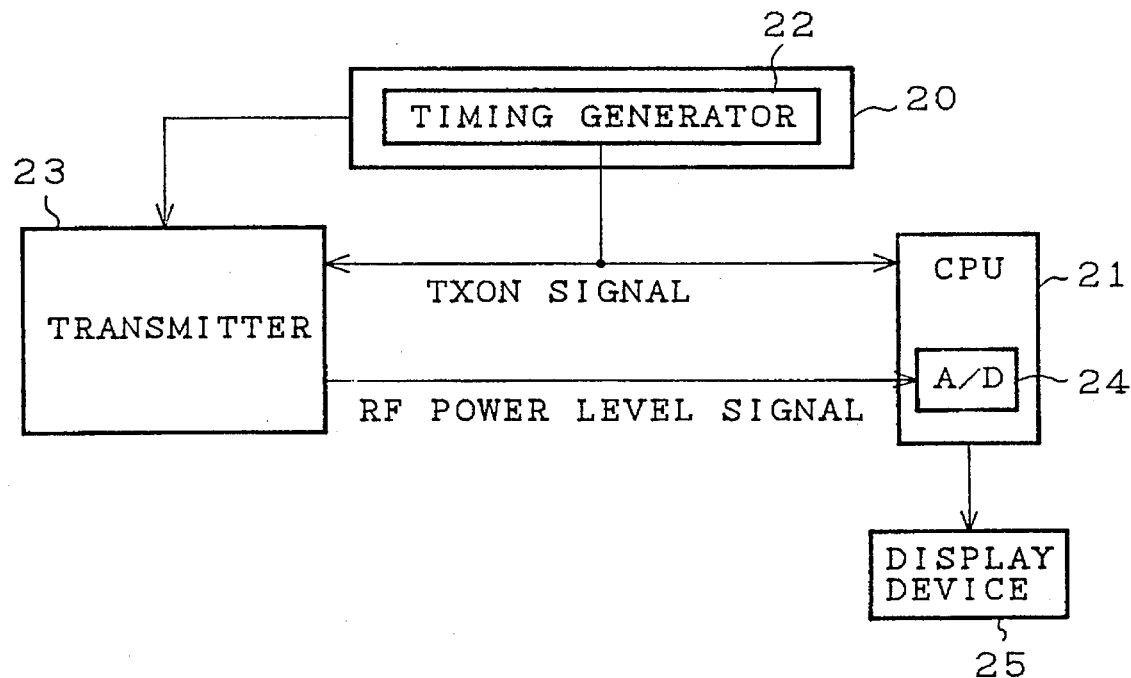
FIG. 1 is a view showing the structure of an RF power level monitoring apparatus according to a first embodiment of the present invention, which is employed in a TDMA mobile communication system.

A first embodiment according to the present invention will hereinafter be described with reference to the accompanying drawings. FIG. 1 is a view showing the structure of an RF power level monitoring apparatus according to the present embodiment, which is employed in a TDMA mobile communication system. Reference numeral 20 indicates a main CPU for electrically processing a transmission signal and a reception signal in accordance with the TDMA procedure. Designated at numeral 21 is a sub CPU which comprises a display controller for producing data to be displayed on a display device 25 and outputting the same therefrom, a device for inputting a detected RF power level of an RF power level signal, an A/D converter 24 for converting the RF power level of the signal into digital data, a TXON signal edge detector for detecting both the leading and trailing edges of a TXON signal shown in FIG. 2(d), the signal being indicative of the fact that data is in transmission, etc. Reference numeral 22 indicates a timing generator for producing and outputting the TXON signal indicative of the fact that the data is in transmission. This timing generator 22 is provided within the main CPU 20. Designated at numeral 23 is a transmitter employed in the TDMA mobile communication system, which is provided with an RF power level detector for detecting the RF power level of the transmission signal. The transmitter 23 is electrically connected to a transmission and reception antenna or a transmission and reception branching filter.

FIG. 2 is a view for describing slots assigned to reception and transmission channels used under the TDMA procedure, and RXON and TXON signals.

When communication is made in the slot "0", the TXON signal shown in FIG. 2(d) is outputted from the timing generator 22 of the CPU 20 upon transmission. The TXON signal is outputted to the transmitter 23 and the TXON signal edge detector of the sub CPU 21. The TXON signal edge detector of the sub CPU 21 detects both the leading and trailing edges of the TXON signal. The sub CPU 21 triggers the A/D converter 24 at the timing at which the TXON signal edge detector has detected the leading edge of the TXON signal thereby to activate the A/D converter 24.

The A/D converter 24 converts the RF power level of the transmission signal, which has been detected by the RF power level detector of the transmitter 23 into digital data. When the conversion of the RF power level into the digital data is completed, the A/D converter 24 informs the sub CPU 21 of its completion.

The sub CPU 21 reads the digital data converted by the A/D converter 24 and recognizes that data read by detecting the leading edge of the TXON signal is of RF power level data at the time of transmission. Then, the sub CPU 21 decides based on the read digital data whether or not the RF power level of the transmission signal is normal.

Data indicative of the normal range of the transmission power level has been stored in the sub CPU 21 in advance. When the digital data converted by the A/D converter 24 falls within the normal range, the sub CPU 21 decides that the RF power level is normal. If the digital data falls beyond the normal range, then the sub CPU 21 decides that the RF power level is not normal.

On the other hand, the sub CPU 21 also triggers the A/D converter 24 at the timing at which the TXON signal edge detector has detected the trailing edge of the TXON signal thereby to reactivate the A/D converter 24. The A/D converter 24 converts an RF power level of the transmission signal detected by the RF power level detector of the transmitter 23 into digital data. After the conversion of the RF power level into the digital data has been completed, the A/D converter 24 informs the CPU 21 of its completion. The sub CPU 21 reads the digital data converted by the A/D converter 24 and recognizes that data read by the detection of the trailing edge of the TXON signal is RF power level data at the time of nontransmission. Then, the sub CPU 21 decides based on the read digital data whether or not the RF power level of the transmission signal is normal.

That is, if the transmission power is 0 in level upon nontransmission, then the sub CPU 21 decides that the RF power level of the transmission signal is normal. If, on the other hand, the transmission power is not 0 in level, then the sub CPU 21 decides that the RF power level thereof is in an improper state.

Thus, when it is decided that the RF power levels detected upon transmission and nontransmission are in the improper state, the sub CPU 21 outputs data indicative of the contents of its improper state to the display device 25 and displays it thereon.

Incidentally, the triggering of the A/D converter 24 may not be simultaneous with the detection of the leading and trailing edges of the TXON signal. As long as, its triggering is made within a time interval corresponding to one slot, the triggering of the A/D converter 24 may be effected even if a predetermined time interval has elapsed since the detection of the leading and trailing edges.

[Second embodiment]

Figure 3:
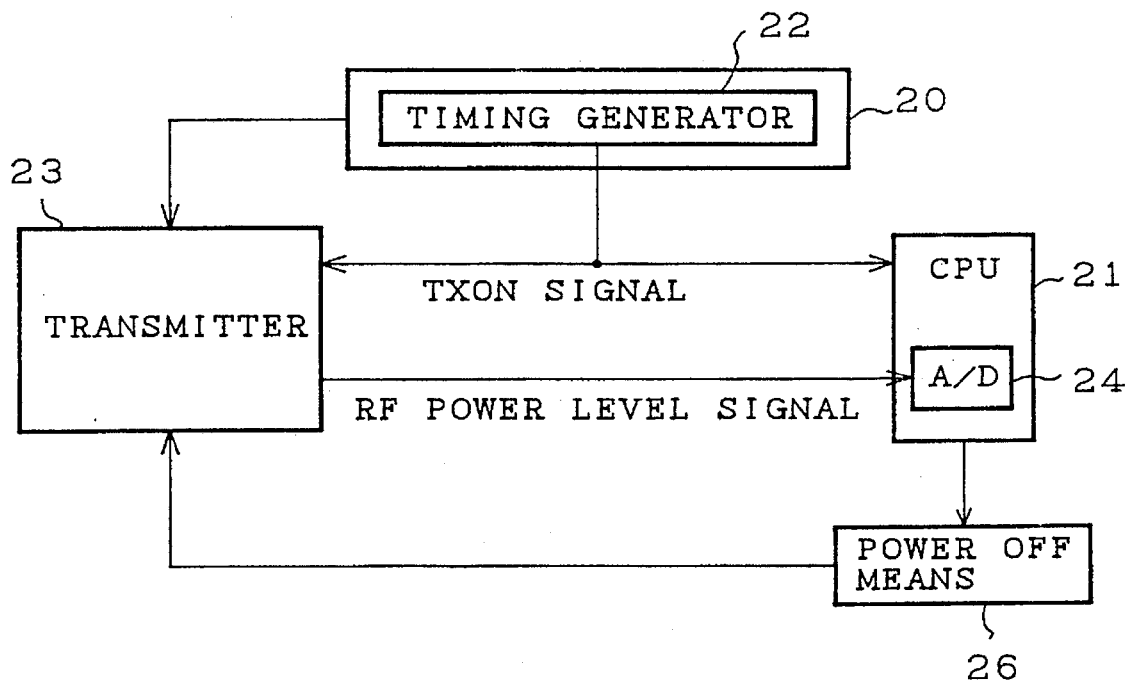
FIG. 3 is a view illustrating the structure of an RF power level monitoring apparatus according to a second embodiment of the present invention, which is employed in a TDMA mobile communication system.

A second embodiment of the present invention will hereinafter be described with reference to FIG. 3. FIG. 3 is a view showing the structure of an RF power level monitoring apparatus according to the present invention, which is employed in a TDMA mobile communication system. The same elements of structure as those in the first embodiment shown in FIG. 1 or the elements of structure similar to those in the first embodiment depicted in FIG. 1 are identified by like reference numerals and their description will therefore be omitted. In FIG. 3, reference numeral 26 indicates a power off means for turning off an RF power amplifier. In this embodiment, the RF power amplifier 26 is turned off when a sub CPU 21 decides that an RF power level is in an improper state upon transmission or nontransmission of a transmission signal.

[Third embodiment]

Figure 4:
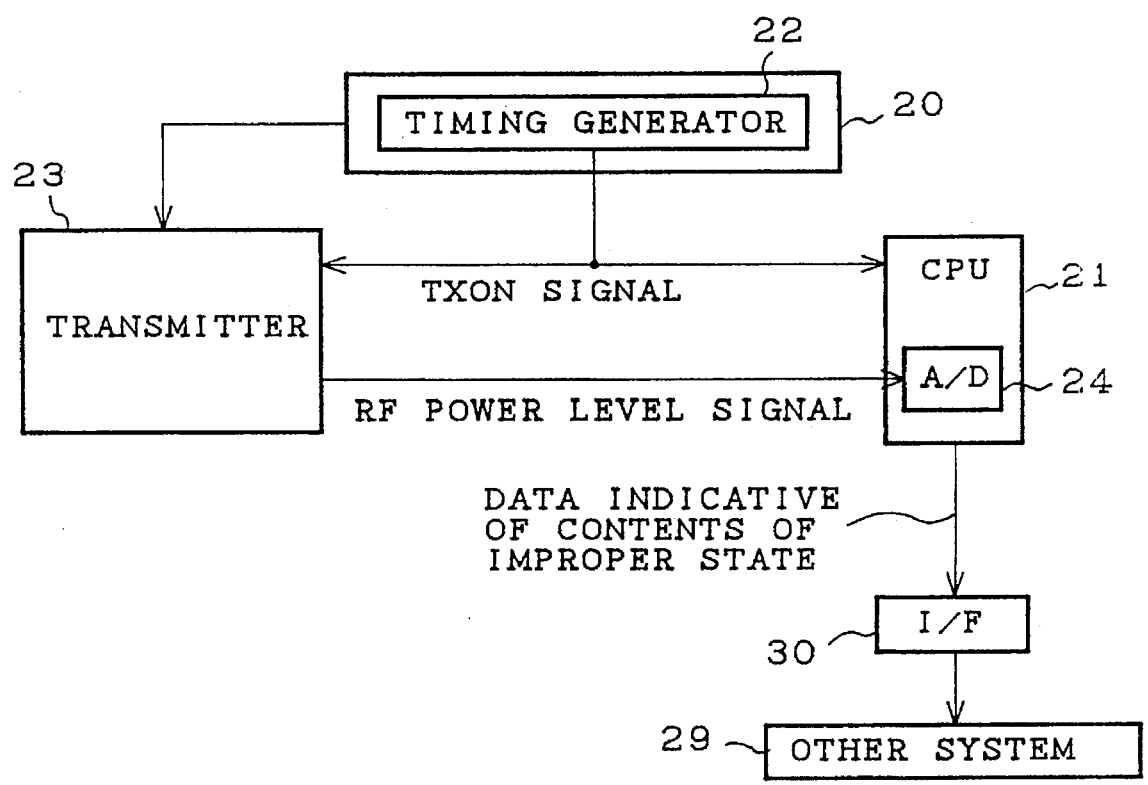
FIG. 4 is a view depicting the structure of an RF power level monitoring apparatus according to a third embodiment of the present invention, which is employed in a TDMA mobile communication system.

A third embodiment of the present invention will hereinafter be described with reference to FIG. 4. FIG. 4 is a view illustrating the structure of an RF power level monitoring apparatus according to the present invention, which is employed in a TDMA mobile communication system. The same elements of structure as those in the first embodiment shown in FIG. 1 or the elements of structure similar to those in the first embodiment depicted in FIG. 1 are identified by like reference numerals and their description will therefore be omitted. In FIG. 4, reference numeral 29 indicates other system and reference numeral 30 indicates an interface circuit. In the present embodiment, when a sub CPU 21 decides that an RF power level at the time of transmission or nontransmission of a transmission signal is in an improper state, data indicative of the contents of its improper state is supplied to the other system 29 through the interface circuit 30.

This arrangement is applied to the case where an improper state of an RF power level is transmitted to a base station as data through a telephone line, for example.

[Fourth embodiment]

Figure 5:
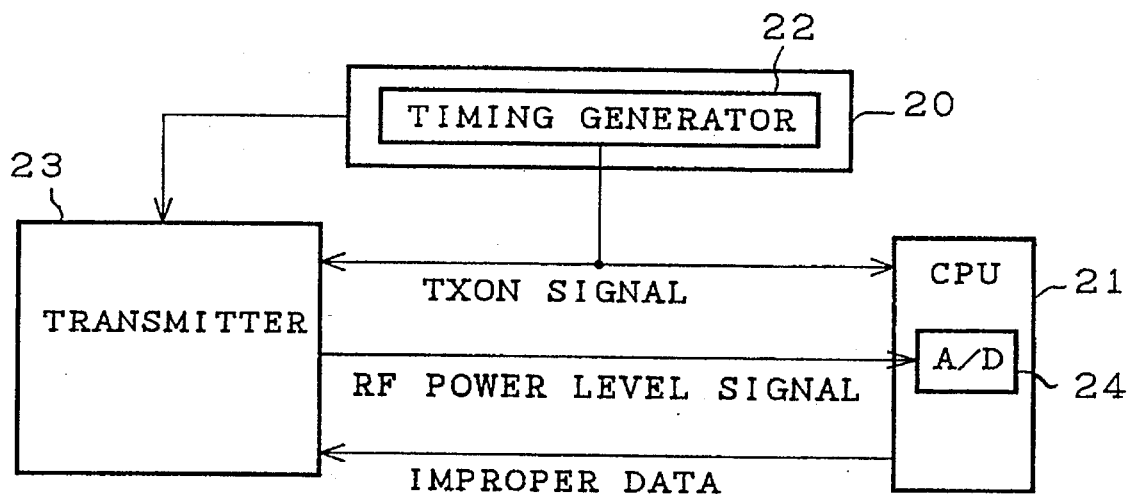
FIG. 5 is a view showing the structure of an RF power level monitoring apparatus according to a fourth embodiment of the present invention, which is employed in a TDMA mobile communication system.
Figure 6:
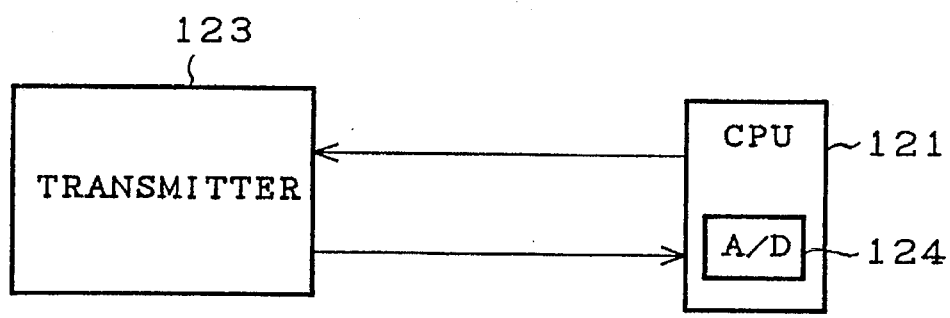
FIG. 6 is a view illustrating the structure of an RF power level monitoring apparatus employed in a conventional analog mobile communication system.

FIG. 5 is a view showing the structure of an RF power level monitoring apparatus according to the fourth embodiment of the present invention, which is employed in a TDMA mobile communication system. In this embodiment, when a sub CPU 21 decides that an RF power level at the time of transmission or nontransmission of a transmission signal is in an improper state, either data indicative of the contents of its improper state or a signal indicative of such a state is sent to a transmitter 23. Then, the transmitter 23 transmits the data to other system 29 to notify its improper state thereto. In this case, other system 29 is a base station, for example. The TDMA mobile communication system notifies an improper state of transmission power to the base station via a wireless line.

The features of the various embodiments disclosed above may, of course, be combined in a single apparatus. That is, a single apparatus may comprise, in any combination, displaying means for displaying the result of the decision by the deciding means, information transmitting means for transmitting information indicative of an improper state of transmission power and means for turning off the power source when the power source level is in an improper state either upon or after the transmission of information indicative of an improper state of transmission power (for example, after the information indicative of an improper state has been transmitted from the transmitter as the high frequency signal).

Having now fully described the invention, it will be apparent to those skilled in the art that many changes and modifications can be made without departing from the spirit or scope of the invention as set forth herein.

What is claimed is:

1. A transmission power level monitoring apparatus for monitoring a level of transmission power generated in a communication system for effecting data communications in accordance with time division multiplexing access, comprising:

transmission start time detecting means for detecting a time at which a transmission of data from said communication system starts and for producing a signal indicative of the start of said transmission of data;

transmission end time detecting means for detecting a time at which the transmission of data from said communication system ends;

transmission power level detecting means for detecting the level of transmission power during a transmission period of said communication system at a time based on said transmission start detected time and for detecting the level of transmission power during a nontransmission period based on said transmission end detected time and for outputting an analog transmission power level signal for each of said transmission and nontransmission periods;

an analog to digital converter connected to be controlled by said signals indicative of the start and end of said transmission of data for converting said analog transmission power level signal into a digital transmission power level signal; and deciding means for deciding whether or not the detected transmission power level during said transmission and nontransmission periods is normal by comparing said digital transmission power level signal with stored data indicative of the normal power levels for said transmission and nontransmission periods.

2. A transmission power level monitoring apparatus according to claim 1, further comprising displaying means for displaying a result of decision by said deciding means.

3. A transmission power level monitoring apparatus according to claim 1, wherein said analog to digital converter converts said level of transmission power measured by said analog transmission power level detecting means into a digital signal after a predetermined time interval has elapsed since each of the times detected by said transmission start time detecting means and said transmission end time detecting means.

4. A transmission power level monitoring apparatus according to claim 3, further comprising means for turning off a power source for a transmitter of said communication system when said deciding means decides that said detected transmission power level is in an improper state.

5. A transmission power level monitoring apparatus according to claim 3, further comprising information transmitting means for transmitting information indicative of an improper state of transmission power to other system when said deciding means decides that said detected transmission power level is in an improper state.

6. A transmission power level monitoring apparatus according to claim 5, wherein said information transmitting means sends the information indicative of an improper state of transmission power, which is transmitted from said communication system as a high-frequency signal.

7. A transmission power level monitoring apparatus according to claim 6, further comprising means for turning off a power source for said information transmitting means after said information has been transmitted from said communication system as the high-frequency signal.

* * * * *